US008624812B2

(12) United States Patent
Lee et al.

(10) Patent No.: US 8,624,812 B2
(45) Date of Patent: Jan. 7, 2014

(54) LIQUID CRYSTAL DISPLAY

(75) Inventors: Byoung-Jun Lee, Cheonan-si (KR); Jang-Hyun Yeo, Seoul (KR); Hyun-Su Lee, Cheonan-si (KR); Seung-Hwan Moon, Yongin-si (KR); Yong-Bum Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 1362 days.

(21) Appl. No.: 11/929,479

(22) Filed: Oct. 30, 2007

(65) Prior Publication Data

US 2008/0191987 A1 Aug. 14, 2008

(30) Foreign Application Priority Data

Feb. 14, 2007 (KR) ........................ 10-2007-0015631

(51) Int. Cl.
*G09G 3/36* (2006.01)
*G02F 1/1343* (2006.01)

(52) U.S. Cl.
USPC .................. 345/92; 345/90; 345/98; 349/143

(58) Field of Classification Search
USPC ............................... 345/30–111; 349/56–166
See application file for complete search history.

(56) References Cited

U.S. PATENT DOCUMENTS

| | | | | |
|---|---|---|---|---|
| 6,671,023 | B2 * | 12/2003 | Tsutsui et al. | 349/143 |
| 2003/0030615 | A1 * | 2/2003 | Maeda et al. | 345/90 |
| 2003/0151584 | A1 | 8/2003 | Song et al. | |
| 2003/0197672 | A1 | 10/2003 | Yun et al. | |
| 2005/0184940 | A1 | 8/2005 | Oh et al. | |
| 2006/0038765 | A1 | 2/2006 | Lee et al. | |
| 2006/0262055 | A1 * | 11/2006 | Takahara | 345/81 |
| 2006/0262069 | A1 * | 11/2006 | Do et al. | 345/98 |
| 2007/0097057 | A1 * | 5/2007 | Shin | 345/98 |
| 2007/0132674 | A1 * | 6/2007 | Tsuge | 345/77 |
| 2007/0164964 | A1 * | 7/2007 | Ha | 345/98 |
| 2007/0171169 | A1 * | 7/2007 | Hirama | 345/94 |
| 2007/0242019 | A1 * | 10/2007 | Jung et al. | 345/98 |
| 2008/0170027 | A1 * | 7/2008 | Kyeong et al. | 345/100 |

FOREIGN PATENT DOCUMENTS

| | | |
|---|---|---|
| JP | 08-320675 | 12/1996 |
| JP | 09-016132 | 1/1997 |
| JP | 2006-010980 | 1/2006 |
| JP | 2006-071891 | 3/2006 |
| KR | 1020030083309 | 10/2003 |
| KR | 1020030083313 A | 10/2003 |
| KR | 1020040052357 | 6/2004 |
| KR | 1020050047756 | 5/2005 |
| KR | 1020050082488 A | 8/2005 |
| KR | 1020060029369 | 4/2006 |

* cited by examiner

*Primary Examiner* — Charles V Hicks
(74) *Attorney, Agent, or Firm* — Innovation Counsel LLP

(57) ABSTRACT

A liquid crystal includes a plurality of pixels, a plurality of gate lines, and a plurality of data lines. The plurality of pixels are arranged in a matrix format. The plurality of gate lines transmit a gate signal to the pixels. The plurality of data lines cross the gate lines and transmit data voltages respectively corresponding to the plurality of pixels a plural number of times. A voltage that is the same as that of the data lines neighboring the first and last data lines is applied to the first and last data lines among the plurality of data lines at least once.

25 Claims, 11 Drawing Sheets

LIQUID CRYSTAL DISPLAY

CROSS-REFERENCE TO RELATED APPLICATION

This application claims priority to and the benefit of Korean Patent Application No. 10-2007-0015631 filed in the Korean Intellectual Property Office on Feb. 14, 2007, the entire contents of which are incorporated herein by reference.

BACKGROUND OF THE INVENTION (a) Field of the Invention

The present invention relates to a liquid crystal display.

(b) Description of the Related Art

A liquid crystal display (LCD) is one of the most widely used flat panel displays (FPD), and it is composed of two display panels on which field generating electrodes such as pixel electrodes and a common electrode are formed, and a liquid crystal layer interposed between the two display panels. A voltage is applied to the field generating electrodes to generate an electric field in the liquid crystal layer, and the orientation of liquid crystal molecules of the liquid crystal layer is determined and the polarization of incident light is controlled through the generated electric field to display an image.

The liquid crystal display includes switching elements each connected to pixel electrodes, and a plurality of signal lines such as data lines and gate lines for applying voltages to the pixel electrodes by controlling the switching elements. Each gate line transfers a gate signal generated from a gate driving circuit, and each data line transfers a data voltage generated from a data driving circuit. The switching element transfers a data voltage to a pixel electrode according to the gate signal.

The gate driving circuit and data driving circuit are typically directly mounted on a display panel in the form of a plurality of IC chips. Alternatively, the gate driving circuit and data driving circuit are mounted on a flexible circuit layer and the flexible circuit layer is attached on a display panel. Such IC chips are responsible for a large percentage of the manufacturing cost of a liquid crystal display. Particularly, since the data driver IC chips are much more expensive than the gate driving circuit IC chips, it is necessary to reduce the number of data driver IC chips for a high resolution and large liquid crystal display. The manufacturing cost of the gate driving circuit can be reduced by integrating the gate driving circuit to the display panel with a gate line, a data line, and a switching element. However, it is very difficult to integrate the data driving circuit to the display panel because the data driving circuit has a complicated structure. Therefore, a reduction of the number of data driver ICs is required.

The above information disclosed in this Background section is only for enhancement of understanding of the background of the invention and therefore it may contain information that does not form the prior art that is already known in this country to a person of ordinary skill in the art.

SUMMARY OF THE INVENTION

In accordance with one embodiment of the present invention a liquid crystal display having fewer data driving circuits reduced variation in luminance difference between respective pixels of the liquid crystal display is provided.

An exemplary liquid crystal display according to an embodiment of the present invention includes a plurality of pixels, a plurality of gate lines, and a plurality of data lines. The plurality of pixels are arranged in a matrix format. The plurality of gate lines transmit a gate signal to the pixel, and the plurality of data lines cross the gate lines and transmit data voltages respectively corresponding to the plurality of pixels a plural number of times. A voltage that is the same as that of the data lines neighboring the first and last data lines is applied to the first and last data lines among the plurality of data lines at least once.

The voltage that is the same as that of the data lines neighboring the first and last data lines may be respectively applied to every other row of the first and last data lines.

The voltage that is the same as that of the data lines neighboring the first and last data lines may be applied to every two other rows of the first and last data lines.

The pixel may include a pixel electrode and a thin film transistor. The pixel electrode has a first side that is parallel with the gate line and a second side that is shorter than the first side and is parallel with the data line. The thin film transistor is connected to the pixel electrode, the gate line, and the data line.

A ratio of a length of the first side to the length of the second side may be 3:1.

The polarities of the data voltages applied to one data line of the plurality of data lines may be the same as each other.

The polarities of the data voltages respectively applied to the neighboring data lines may be opposite to each other.

The thin film transistor may be connected to at least every other row of the first and the last data lines.

The liquid crystal display may further include a data driver and a signal controller. The data driver applies a data voltage to the data line. The signal controller processes an input image signal to generate a preliminary image signal after receiving the input image signal, and transmits the preliminary image signal as an output image signal to the data driver. The signal controller may include a temporary storage device and a plurality of multiplexers. The temporary storage device stores the preliminary image signal, while the plurality of multiplexers select the preliminary image signal from the temporary storage device according to a row of a corresponding pixel and output the selected preliminary image signal as the output image signal. The multiplexers include a first multiplexer connected to the first or last data line and a second multiplexer neighboring the first multiplexer. The first and second multiplexers select and output the same preliminary image signal with respect to the pixel in the same row.

The data voltage corresponding to each pixel may be applied to the pixel to perform a main-charging operation after the pixel is pre-charged.

A charging time of the pixel may be 2/3 H, the pixel may be pre-charged for a former 1/3 H, and the pixel may be main-charged for a latter 1/3 H.

The charging times of the pixels neighboring in a column direction may be overlapped for 1/3 H.

A voltage for pre-charging a first pixel row may be a voltage for inverting a polarity of a voltage that may be lastly applied in a previous frame.

The voltage for pre-charging the first pixel row may be a voltage corresponding to a 0 gray or an intermediate gray.

A load signal for applying the data voltage to the pixel and an inversion signal for inverting the polarity of the data voltage for each frame may be applied to the data line, the load signal includes a first pulse and a second pulse, the first pulse may pre-charge the first pixel row, the second pulse may main-charge the first pixel row, and the level of the inversion signal may be charged previous to the first pulse.

An exemplary liquid crystal display according to an embodiment of the present invention may include a plurality of pixels and a data line. The plurality of pixels are arranged in a matrix format. The data voltages respectively corresponding to the plurality of pixels, and a load signal for applying the data voltage to the pixel and an inversion signal for inverting a polarity of the data voltage for each frame are applied to the data line. The data voltage corresponding to each pixel may be applied to main-charge the pixel after the pixel is pre-charged. The load signal may include a first pulse and a second pulse, the first pulse applies the data voltage for pre-charging a first pixel row and the second pulse applies the data voltage for main-charging the first pixel row, and a level of the inversion signal is changed previous to the first pulse.

An exemplary liquid crystal display according another exemplary embodiment of the present invention may include a plurality of pixels, a plurality of data lines, a data driver, and a signal controller. The plurality of data lines are connected the pixels to transmit a data voltage to the pixel. The data driver applies the data voltage to the data line. The signal controller processes an input image signal and transmits an output image signal to the data driver. The signal controller may include a temporary storage device for storing the output image signal and a plurality of multiplexers for selecting the output image signal from the temporary storage device according to a row of the pixel corresponding to the output image signal and outputting the selected output images signal. The multiplexer may include a first multiplexer connected to the first or last data line and a second multiplexer neighboring the first multiplexer. The first and second multiplexers may select and output the same output image signal with respect to the pixel of the same row.

The signal controller may include a first output unit and a second output unit, the output image signal applied to the first data line may be output through the first output unit, and the output image signal applied to the last data line may be output through the second output unit.

The first output unit may include a first multiplexer connected to the first data line and a second multiplexer connected to the second data line, and the first and second multiplexers may select the preliminary image signal in an odd row or an even row and output the selected preliminary image signal as the output image signal.

The second output unit may include a first multiplexer connected to the last data line and a second multiplexer connected to the data line neighboring the last data line, and the first and second multiplexers may select and output the same output image signal in an odd row or an even row.

The pixel may include a pixel electrode and a thin film transistor. The pixel electrode has a first side that is parallel to the data line and a second side that is longer than the first side and neighbors the first side. The thin film transistor is connected to the pixel electrode.

A ratio of a length of the first side to the length of the second side may be 1:3.

Polarities of the data voltages applied to one data line among the data lines may be the same as each other. Polarities of the data voltages respectively applied to the neighboring data lines may be opposite to each other.

The thin film transistor may be connected to at least every other row of the first and the last data lines.

DETAILED DESCRIPTION OF THE EMBODIMENTS

Figure 1:
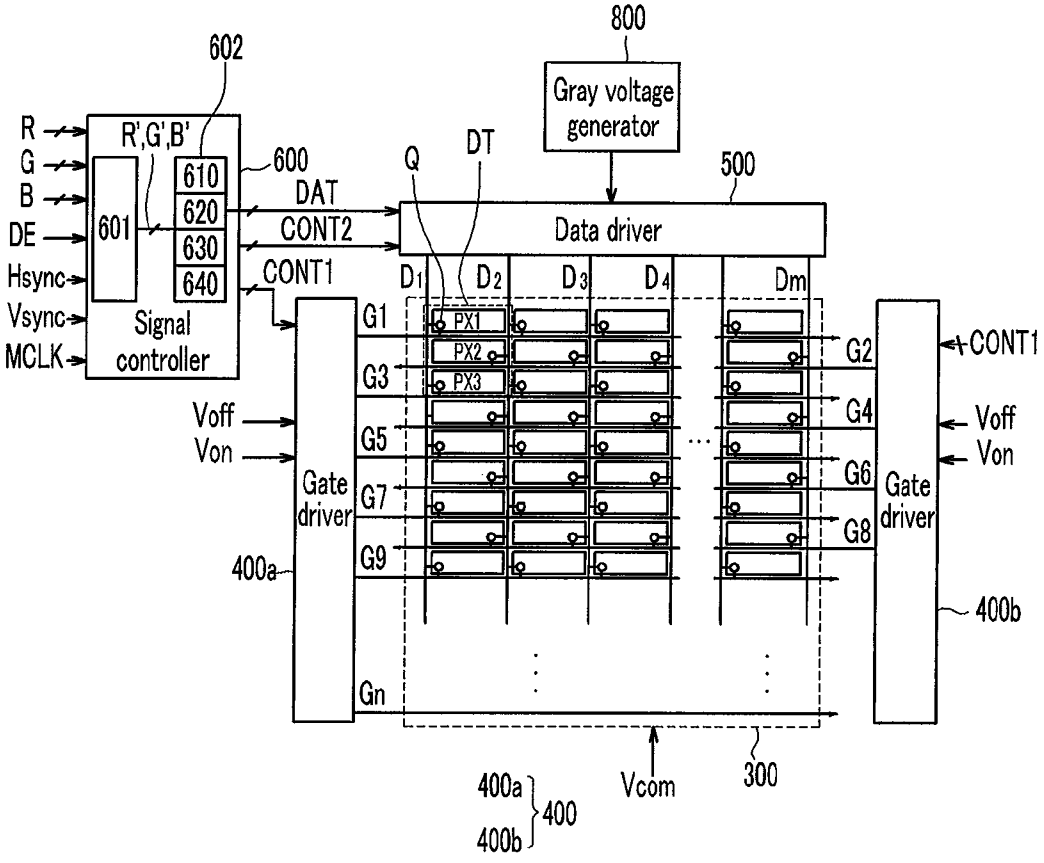
FIG. 1 is a block diagram of a liquid crystal display according to an exemplary embodiment of the present invention.

The present invention is described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display according to an exemplary embodiment of the present invention is described below with reference to FIG. 1 and FIG. 2.

Figure 2:
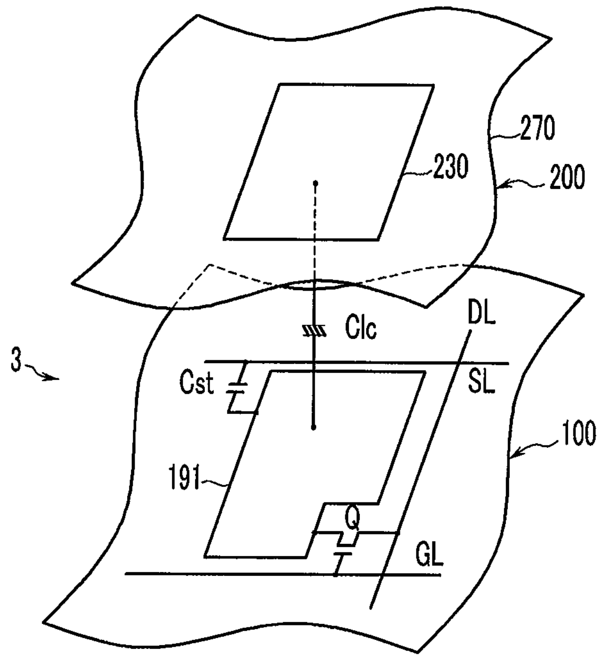
FIG. 2 is an equivalent circuit diagram of one pixel of the liquid crystal display according to the exemplary embodiment of the present invention.

FIG. 1 is a block diagram of the liquid crystal display according to the exemplary embodiment of the present invention, and FIG. 2 is an equivalent circuit diagram of one pixel of the liquid crystal display according to the exemplary embodiment of the present invention.

As shown in FIG. 1 and FIG. 2, the liquid crystal display according to the exemplary embodiment of the present invention includes a liquid crystal panel assembly 300, a gate driver 400 coupled to the liquid crystal panel assembly 300, a data driver 500, a gray voltage generator 800 coupled to the data driver 500, and a signal controller 600 for controlling them.

In a view of an equivalent circuit, the liquid crystal panel assembly 300 includes a plurality of display signal lines and a plurality of pixels PX1, PX2, and PX3 connected to the display signal lines and arranged in a matrix format. In the structure illustrated in FIG. 2, the liquid crystal panel assembly 300 includes lower and upper panels 100 and 200 that face each other and a liquid crystal layer 3 interposed therebetween.

The signal lines includes a plurality of gate lines $G_1$ to $G_n$ for transmitting a gate signal (also referred to as a "scanning signal") and a plurality of data lines $D_1$ to $D_m$ for transmitting a data voltage. The gate lines $G_1$ to $G_n$ extend basically in a row direction to run almost parallel to each other, while the data lines $D_1$ to $D_m$ extend basically in a column direction to run almost parallel to each other.

Each of the pixels PX1, PX2, and PX3 has a longitudinal structure in a row direction. For example, the pixels PX1, PX2, and PX3 connected to the gate line (GL) and the data line (DL) include a switching element Q connected to the signal lines (GL, DL) and a liquid crystal capacitor C1*c* and a storage capacitor Cst connected thereto. The storage capacitor Cst may be omitted if necessary.

The switching element Q is a three-terminal element such as a thin film transistor disposed at the lower panel 100. The switching element Q includes a control terminal connected to a gate line (GL), an input terminal connected to a data line (DL), and an output terminal connected to a liquid crystal capacitor C1*c* and a storage capacitor Cst. Referring to FIG. 1, each pixel line is adjacent to two data lines, and the pixels PX1, PX2, and PX3 in each pixel line are alternately connected to two data lines. In other words, a switching element Q of respective neighboring pixels PX1, PX2, and PX3 in each pixel line is connected to the different data lines $D_1$ to $D_m$.

The liquid crystal capacitor C1*c* uses a pixel electrode 191 at a lower panel 100 and a common electrode 270 of an upper panel 200 as two terminals, and a liquid crystal layer 3 between two electrodes 191 and 270 functions as a dielectric material. The pixel electrode 191 is connected to the switching element Q. The common electrode 270 is formed on the entire surface of the upper panel 200 and receives a common voltage Vcom. Unlike in FIG. 2, the common electrode 270 can be formed at the lower panel 100. In this case, at least one of the two electrodes 191 and 270 can be made in a line shape or a rod shape.

An additional signal line (not shown) provided to the lower panel 100 and the pixel electrode 191 are overlapped while providing an insulator between the additional signal line and the pixel electrode 191 to form the storage capacitor Cst that acts as a subsidiary capacitor of the liquid crystal capacitor C1*c,* and the additional signal line receives predetermined voltages, such as the common voltage Vcom. Further, the pixel electrode 191 and a previous gate line Gi−1 are overlapped while providing the insulator between the pixel electrode 191 and a previous gate line $G_{i-1}$ to form the storage capacitor Cst.

Meanwhile, in order to perform color display, each pixel PX specifically displays one of the primary colors (spatial division), or the pixels PX alternately display the primary colors over time (temporal division), which causes the primary colors to be spatially or temporally synthesized, thereby displaying a desired color. The primary colors may include red, green, and blue. As an example of the spatial division, FIG. 2 shows that each pixel PX has a color filter 230 for displaying one of the primary colors in a region of the upper display panel 200 corresponding to the pixel electrode 191. Unlike the structure shown in FIG. 2, the color filter 230 may be provided above or below the pixel electrode 191 of the lower display panel 100. Color filters 230 of pixels PX1-PX3 adjacent in a row direction lengthily extend in a row direction and are connected to one another, and color filters 230 for different colors are alternately arranged in a column direction.

It is assumed that each color filter 230 displays a unique color of red, green, and blue throughout the specification. A red pixel is a pixel with a red color filter 230, a green pixel is a pixel with a green color filter 230, and a blue pixel is a pixel with a blue color filter 230. The red pixel, blue pixel, and green pixel are sequentially and alternately arranged in a column direction.

As described above, the pixels PX1-PX3 of three primary colors form one dot (DT) as a basic unit of image display.

Referring back to FIG. 1, the gate driver 400 includes first and second gate drivers 400*a* and 400*b* respectively provided on left and right sides of the pixels PX1 to PX3. The gate driver 400 along with the signal lines $G_1$ to $G_n$ and $D_1$ to $D_m$ and the thin film transistor switching element Q is integrated to the liquid crystal panel assembly 300. The gate drivers 400*a* and 400*b* are alternately connected to an odd-numbered gate line and an even-numbered gate line, and apply a gate signal formed by a combination of a gate-on voltage Von and a gate-off voltage Voff to the gate lines $G_1$ to $G_n$. In addition, the gate driver 400 may be provided on one side of the assembly 300. Further, the gate driver 400 may be directly mounted on the assembly 300 as an IC chip, may be mounted on a flexible printed circuit film (not shown) to be attached on the liquid crystal panel assembly 300 in a tape carrier package (TCP) type, or may be mounted on an additional printed circuit board (PCB).

At least one polarizer (not shown) is provided on an outer surface of the liquid crystal panel assembly 300.

The gray voltage generator 800 generates two sets of gray voltages related to transmittance of the pixels PX. One of the two sets of gray voltages has a positive value and the other has a negative value with respect to the common voltage Vcom.

The data driver 500 is coupled to the data lines $D_1$ to $D_m$ of the liquid crystal panel assembly 300, and it selects the gray voltage received from the gray voltage generator 800 and applies the selected gray voltage as a data voltage to the data lines $D_1$ to $D_m$. However, when the gray voltage generator 800 does not provide all the gray voltages but provides the limited number of reference gray voltages, the data driver 500 divides the reference gray voltage and selects a desired data voltage therefrom. The data driver 500 may be directly mounted on the liquid crystal panel assembly 300 as an IC chip. Alternatively, the data driver 500 may be attached on the liquid crystal panel assembly 300 as the tape carrier package (TCP) by being mounted on the flexible printed circuit film (not shown), or mounted on the additional printed circuit board (PCB). Alternatively, the data driver 500 can be integrated with the liquid crystal panel assembly 300 with the signal lines $G_1$ to $G_n$ and $D_1$ to $D_m$ and the thin film transistor switching element Q.

As described above, a horizontal length of the pixel PX is greater than a vertical length thereof, and the horizontal length is three times the vertical length. Accordingly, compared to when the horizontal length is less than the vertical length, the number of the pixel electrodes 191 positioned on each row is small, and the number of the pixel electrodes 191 positioned on each column is large. Since the number of the data lines $D_1$ to $D_m$ is reduced, the number of IC chips for the data driver 500 is reduced, and the cost for materials may be reduced. Here, since the gate driver along with the gate lines $G_1$ to $G_n$, the data lines $D_1$ to $D_m$, and the thin film transistor may be integrated to the assembly 300 while the number of gate lines $G_1$ to $G_n$ is increased, a resolution problem is not caused by the increase of the number of the gate lines $G_1$ to $G_n$. In addition, even though the gate driver 400 is mounted as an IC chip, because the cost of the IC chip for the gate driver 400 is less than that of the IC chip for the data driver 500, and it is better to reduce the number of IC chips for the data driver 500.

The signal controller 600 controls the gate driver 400 and the data driver 500. The signal controller 600 includes a temporary storage device 601 and an output unit 602 connected to the temporary storage device 601. The output unit 602 includes a first output unit 610, a second output unit 620, a third output unit 630, and a fourth output unit 640.

An operation of the liquid crystal display will now be described in further detail.

The signal controller 600 receives input image signals R, G, and B, and input control signals for controlling the input image signals R, G, and B from an external graphics controller (not shown). The input image signals R, G, and B include luminance information of each pixel PX, and the luminance has a predetermined number of grays (e.g., 1024(=$2^{10}$), 256 (=$2^8$), or 64(=$2^6$)). The input control signals may include a vertical synchronization signal Vsync, a horizontal synchronization signal Hsync, a main clock signal MCLK, and a data enable signal DE.

The signal controller 600 appropriately processes the input image signals R, G, and B according to an operating conditions of the liquid crystal panel assembly 300 based on the input control signal and the input image signals R, G, and B, and generates preliminary image signals R', G', and B'. In addition, the signal controller 600 generates a gate control signal CONT1 and a data control signal CONT2, and then transmits the gate control signal CONT1 to the gate driver 400.

In this case, preliminary image signals R', G', and B' are stored in the temporary storage device 601, and outputted as an output image signal DAT through the output unit 602. The output unit 602 selectively outputs the preliminary image signals R', G', and B' stored in the temporary storage device 601 to rearrange the preliminary image signals R', G', and B' according to the arrangement of the pixel shown in FIG. 1, which will be described later.

The gate control signal CONT1 includes a scanning start signal STV and at least one clock signal for controlling an output cycle of the gate-on voltage Von. Further, the gate control signal CONT1 may include an output enable signal OE for defining the duration of the gate-on voltage Von.

The data control signal CONT2 includes a horizontal synchronizing start signal STH for informing transmission start of the digital image signal DAT for the pixel of one row, and a load signal TP and a data clock signal HCLK for applying an analog data voltage to the data lines $D_1$ to $D_m$. Further, the data control signal CONT2 may include an inversion signal REV for inverting data voltage polarity with respect to the common voltage Vcom (hereinafter, the data voltage polarity with respect to the common voltage Vcom will be referred to as a "data voltage polarity").

According to the data control signal CONT2 from the signal controller 600, the data driver 500 receives the output image signal DAT for the pixel of one row, selects a gray voltage corresponding to each output image signal DAT, and converts the digital output image signal DAT to an analog data voltage and applies it to the corresponding data lines $D_1$ to $D_m$.

The gate driver 400 applies the gate-on voltage Von to the gate lines $G_1$ to $G_n$ according to the gate control signal CONT1 from the signal controller 600 to turn on the switching element Q coupled to the gate lines $G_1$ to $G_n$. Thereby, the data voltage applied to the data lines $D_1$ to $D_m$ is applied to the corresponding pixel PX through the turned on switching element Q.

A difference between the data voltage applied to the pixel PX and the common voltage Vcom is expressed as a charged voltage of the liquid crystal capacitor C1*c* (i.e., a pixel voltage). An arrangement of liquid crystal molecules varies according to the intensity of the pixel voltage, and therefore polarized light penetrating the liquid crystal layer 3 varies. The variation of the polarized light is expressed as a transmittance variance of the light, and therefore the pixel PX expresses the luminance expressed by the gray of the image signals DAT.

The above operation is repeatedly performed for every 1/3 horizontal period (which is referred to as "1/3 H" where 1 H is equal to one period of the horizontal synchronization signal Hsync). In this way, the gate-on voltage Von is sequentially applied to all the gate lines $G_1$ to $G_n$, and the data signals are supplied to all the pixels PX, thereby displaying one frame of an image.

After one frame ends, a subsequent frame is started, and a state of the inversion signal REV applied to the data driver 500 to invert the polarity of the data voltage applied to each pixel PX from the polarity of a previous frame is controlled, which is referred to as "frame inversion". In this case, in one frame, the polarity of the data voltage flowing through one data line may be periodically changed according to characteristics of the inversion signal REV (e.g., row inversion and dot inversion), or the polarities of the data voltage applied to one pixel row may be different. (e.g., column inversion and dot inversion).

As shown in FIG. 1, when neighboring pixels PX1, PX2, and PX3 in each pixel array are connected to data lines at opposite sides, if a data driver 500 supplies a data voltage having an opposite polarity to an adjacent data line in column inversion and does not change the polarity for one frame, the polarities of pixel voltages of the neighboring pixels PX1, PX2, and PX3 adjacent in a row direction and a column direction become opposite to each other. That is, an apparent inversion shown in a screen becomes a dot inversion.

An arrangement of the liquid crystal panel assembly according to another exemplary embodiment of the present invention will now be described with reference to FIG. 3.

Figure 3:
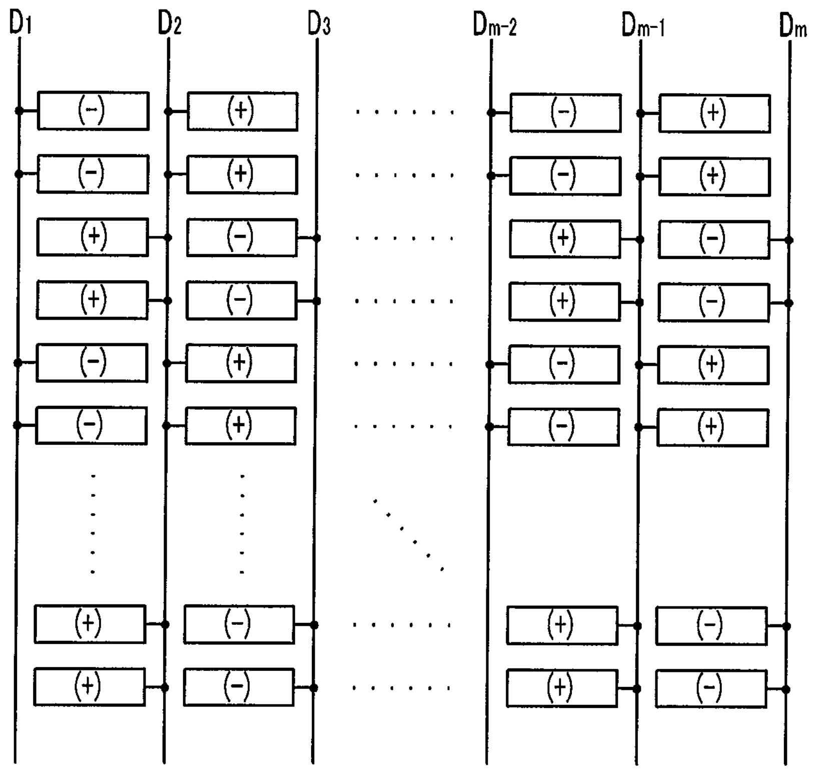
FIG. 3 is a diagram illustrating an arrangement of a liquid crystal panel assembly according to another exemplary embodiment of the present invention.

FIG. 3 is a diagram representing the arrangement of the liquid crystal panel assembly according to another exemplary embodiment of the present invention.

Referring to FIG. 3, in the liquid crystal display according to the other exemplary embodiment of the present invention, the neighboring pixels in each pixel array are connected to data lines at opposite sides for every two pixels. In this case, the data driver 500 applies the data voltages having opposite polarities to the neighboring data lines in column inversion, and if the polarity is not changed during one frame, the polarities of the neighboring pixels adjacent in a row direction and a column direction become opposite to each other for every two pixels. That is, the apparent inversion shown in a screen becomes 2×1 dot inversion.

The data voltage of the liquid crystal display according to the exemplary embodiment of the present invention is described below with reference to FIG. 1, FIG. 2, and FIG. 4 to FIG. 10.

Figure 4:
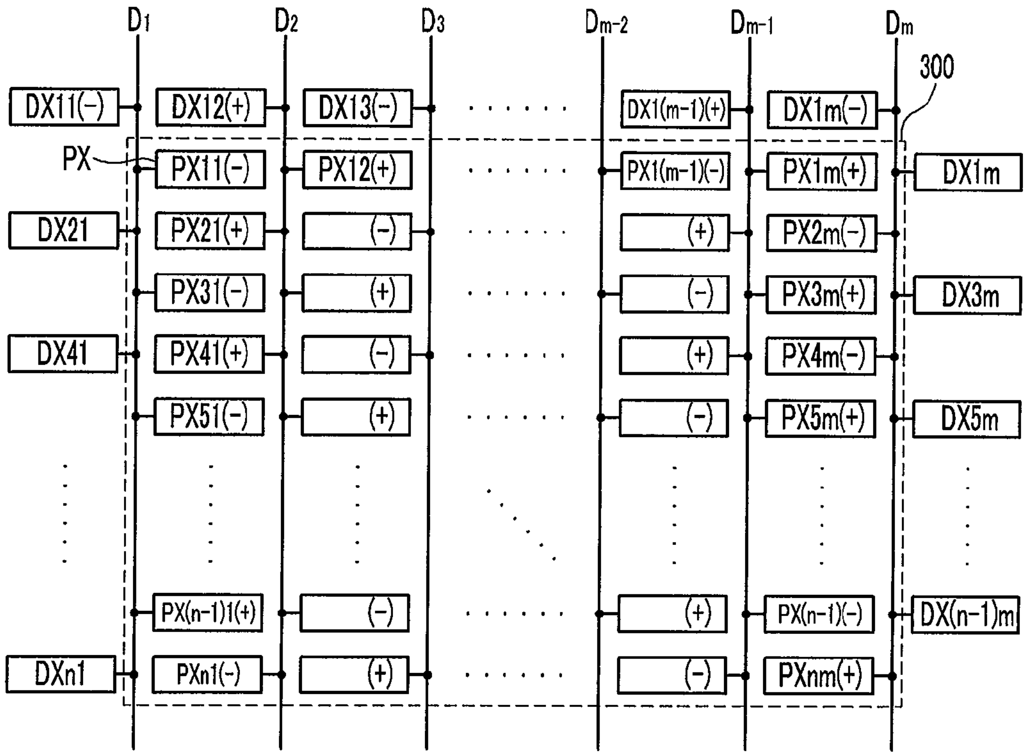
FIG. 4 is a diagram illustrating a spatial arrangement of pixels and data lines of the liquid crystal panel assembly according to the exemplary embodiment of the present invention.
Figure 5:
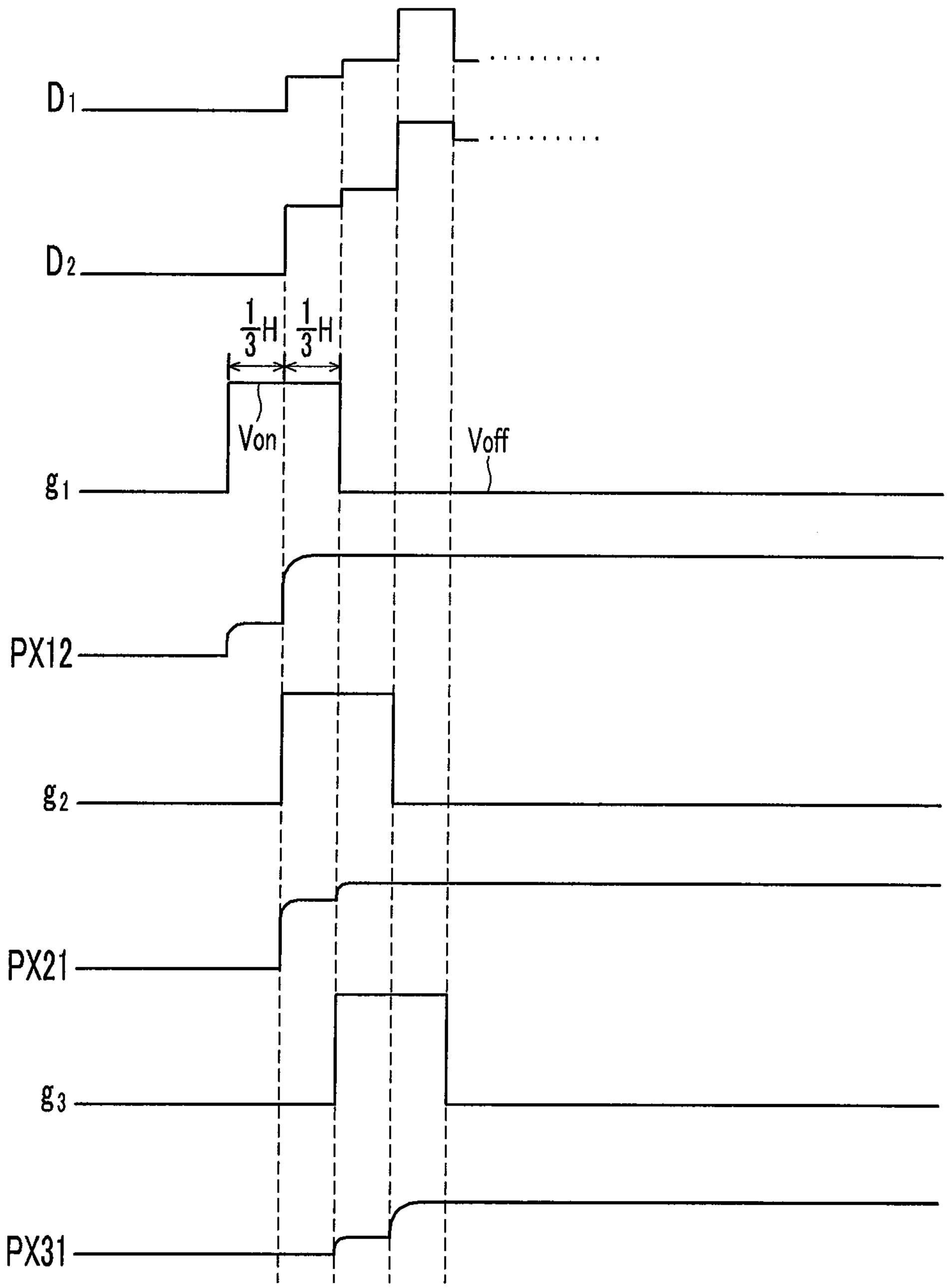
FIG. 5 is a waveform diagram illustrating a gate signal of the liquid crystal display according to the exemplary embodiment of the present invention.

FIG. 4 is a diagram representing a spatial arrangement of the pixels and the data lines of the liquid crystal panel assembly according to the exemplary embodiment of the present invention, and FIG. 5 is a waveform diagram representing the gate signal of the liquid crystal display according to the exemplary embodiment of the present invention.

Refereeing to FIG. 4, in the liquid crystal panel assembly 300 according to the exemplary embodiment of the present invention, a plurality of pixels PX are arranged in a matrix format, and the data lines $D_1$ to $D_m$ are disposed between the respective pixels PX in a like manner of the arrangement shown in FIG. 1. As described above, the pixels PX neighboring in a column direction are respectively connected to different data lines $D_1$ to $D_m$. For better comprehension and ease of description, the gate lines and the switching elements are not illustrated in FIG. 4.

In this case, the second data line $D_2$ to the $(m-1)^{th}$ data line $D_{m-1}$ are respectively connected to the pixels of both sides about the data line $D_2$ to $D_{m-1}$ in every row. The first data line $D_1$ is connected to the pixels PX11, PX31, PX51, . . . , and PX(n−1)1 disposed on the right side of the first data line $D_1$ in an odd row, and is not connected to any pixel in an even row. The data line $D_m$ is connected to the pixels PX2*m*, PX4*m*, . . . , and PXnm disposed on the left side of the data line $D_m$ in an even row, and is not connected to any pixel in an odd row.

Accordingly, the data voltage corresponding to each pixel PX is sequentially applied to the second data line $D_2$ to the $(m-1)^{th}$ data line $D_{m-1}$ for each predetermined period (e.g., 1/3 H). However, the data voltage may not be applied to the first data line $D_1$ and the last data line $D_m$ for a time corresponding to the row that is not connected to the pixel PX.

As shown in FIG. 5, the gate signals $g_1$, $g_2$, and $g_3$ of the liquid crystal display according to the exemplary embodiment of the present invention respectively include the gate-on voltage Von and the gate-off voltage Voff. As described above, the switching element Q is turned on during a gate-on voltage Von time, and the data voltage applied to the data lines $D_1$ to $D_m$ is applied to the corresponding pixel PX through the turned on switching element Q to charge the pixel.

However, in the liquid crystal display according to the exemplary embodiment of the present invention, the horizontal length is three times the vertical length.

Accordingly, compared to when the horizontal length is less than the vertical length, the number of pixel electrodes 191 positioned in each row is small, and the number of pixel electrodes 191 positioned in each column is large. Accordingly, the number of data lines $D_1$ to $D_m$ is reduced, and the number of gate lines $G_1$ to $G_n$ is increased to three times the number of data lines $D_1$ to $D_m$. That is, three gate lines $G_1$ to $G_n$ are disposed for every one dot DT row (i.e., a row including one dot DT). Accordingly, a time for applying the gate-on voltage Von of the gate signal to the gate lines $G_1$ to $G_n$ is reduced by 1/3. However, when the time of the gate-on voltage Von is reduced by 1/3, a time for charging the pixel is not sufficiently obtained.

Therefore, in the liquid crystal display according to the exemplary embodiment of the present invention, the duration of the gate-on voltage Von of the respective gate signals g1, g2, and g3 is set to be 2/3 H as shown in FIG. 5, a pre-charging is performed during a former half 1/3 H of the 2/3 H, and a main-charging is performed during a latter half 1/3 H of the 2/3 H. In this case, a voltage for pre-charging the pixel (hereinafter referred to as a "pre-charging voltage") is a data voltage applied to the pixel PX connected to a previous row of the corresponding data line $D_1$ to $D_m$, and a voltage for main-charging the pixel (hereinafter referred to as a "main-charging voltage") is a data voltage applied to the corresponding pixel PX.

Referring back to FIG. 4, the pixel PX21 arranged in a second row and a first column is referred to as a first pixel, the pixel PX31 arranged in a third row and the first column is referred to as a second pixel, and the pixel PX12 arranged in a first row and a second column is referred to as a third pixel. The first to third pixels PX21, PX31, and PX12 will be compared.

The first pixel PX21 is connected to the second data line $D_2$ to receive the data voltage through the second data line $D_2$. The first pixel PX21 is pre-charged with the data voltage applied to the third pixel PX12 during the 1/3 H, and subsequently, the first pixel PX21 is main-charged with the data voltage applied to the first pixel PX21 during the 1/3 H.

Since the second pixel PX31 is connected to the first data line D1, it receives the data voltage flowing through the first data line $D_1$. However, since the first data line $D_1$ is not connected to the pixel in the second row, the second pixel PX31 may not be pre-charged. Accordingly, the luminance after the second pixel PX31 is main-charged is less than the luminance of the first pixel PX21.

Therefore, even though the first data line $D_1$ is not connected to a pixel in even rows in the liquid crystal display according to the exemplary embodiment of the present invention, a predetermined data voltage is applied. In FIG. 4, the data voltages applied to parts of the first data line $D_1$ that are not connected to any pixel are denoted by DX21, DX41, . . . , and DXn1. For example, a voltage corresponding to an intermediate gray among all grays may be applied to the DX21, DX41, . . . , and DXn1 of the first data line D1.

In addition, the data voltage corresponding to the first pixel PX21 (i.e., a pixel neighboring the part of the first data line $D_1$ that is not connected to the pixel) may be applied to the first data line $D_1$ in addition to the second data line $D_2$. That is, the pre-charging voltage of the second pixel PX31 is set to be the same as the main-charging voltage of the first pixel PX21. The data voltages DX21, DX41, . . . , and DXn1 applied to the parts of the first data line $D_1$ that are not connected to the pixel are the same as the main-charging voltages of the neighboring pixels PX21, PX41, . . . , and PXn1. Thereby, since all the pixels PX in the first column are sufficiently pre-charged, a luminance difference between the respective pixels may be prevented.

While the description has been given based on the first data line $D_1$, the last data line $D_m$ may be applied in a like manner of the first data line $D_1$. That is, data voltages DX1*m*, DX3*m*, DX5*m*, . . . , and DX(n−1)m applied to parts of the last data line $D_m$ that are not connected to the pixel are the same as the main-charging voltages of the neighboring pixels PX1*m*, PX3*m*, PX5*m*, . . . , and PX(n−1)m. Thereby, since all the pixels PX in the last column are sufficiently pre-charged, a luminance difference between the respective pixels may be prevented.

In addition, the above description may be applied to the liquid crystal display shown in FIG. 3.

An output method of the output image signal according to the pixel arrangement in the liquid crystal display will be described with reference to FIG. 6 to FIG. 10.

Figure 6:
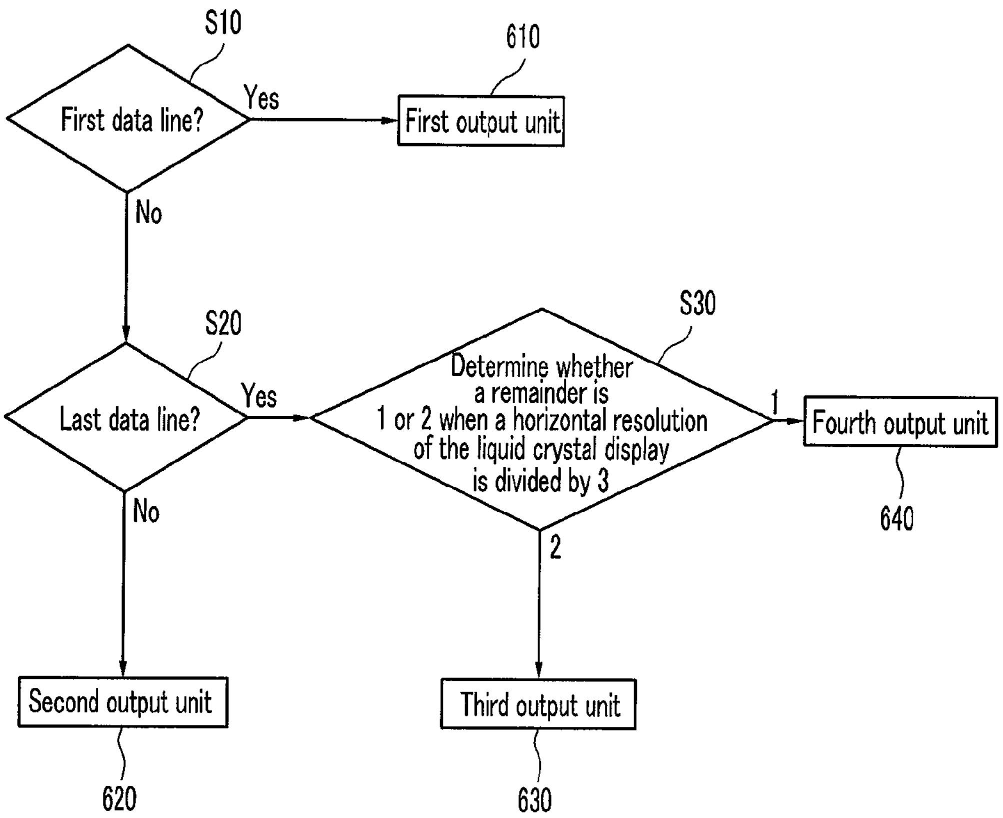
FIG. 6 is a flowchart illustrating an output method of a image signal of the liquid crystal display according to the exemplary embodiment of the present invention.
Figure 7:
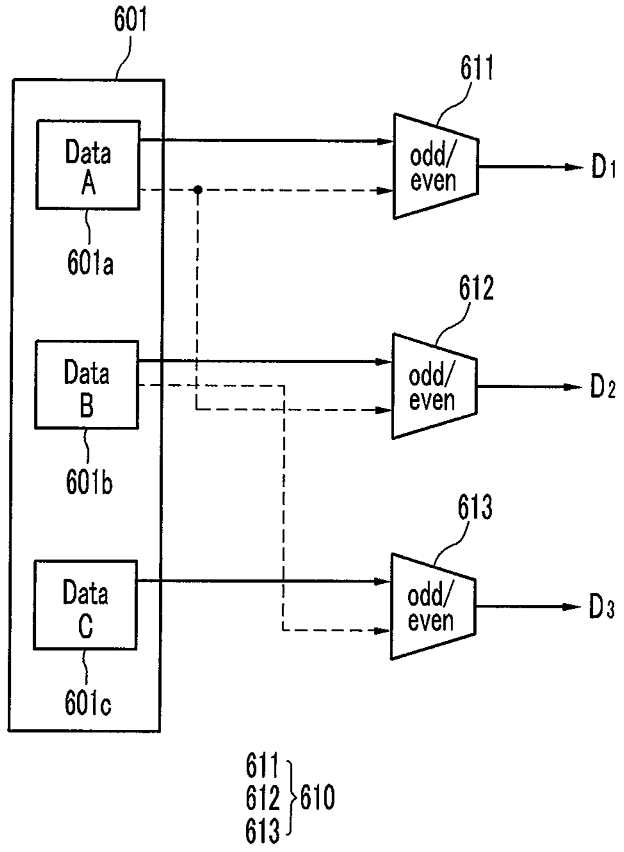
FIG. 7 is a block diagram illustrating a first output unit of a signal controller according to the exemplary embodiment of the present invention.
Figure 8:
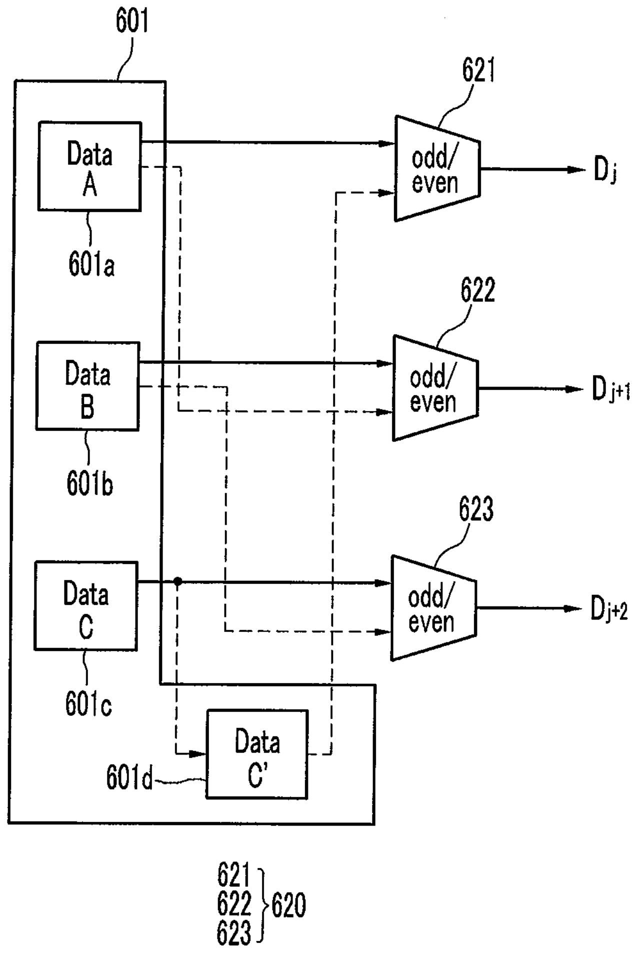
FIG. 8 is a block diagram illustrating a second output unit of the signal controller according to the exemplary embodiment of the present invention.
Figure 9:
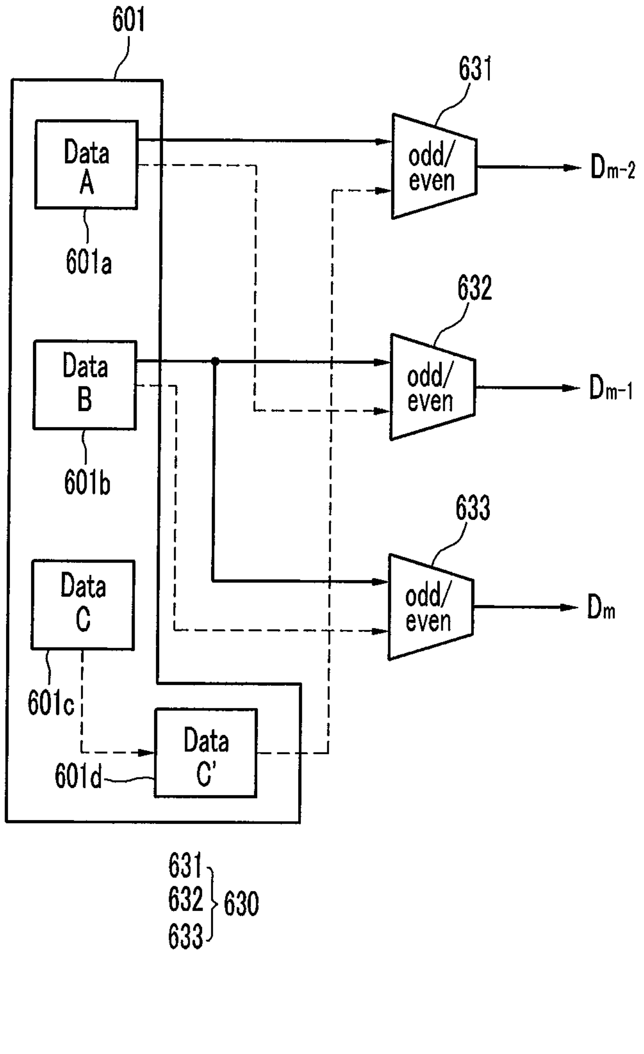
FIG. 9 is a block diagram illustrating a third output unit of the signal controller according to the exemplary embodiment of the present invention.
Figure 10:
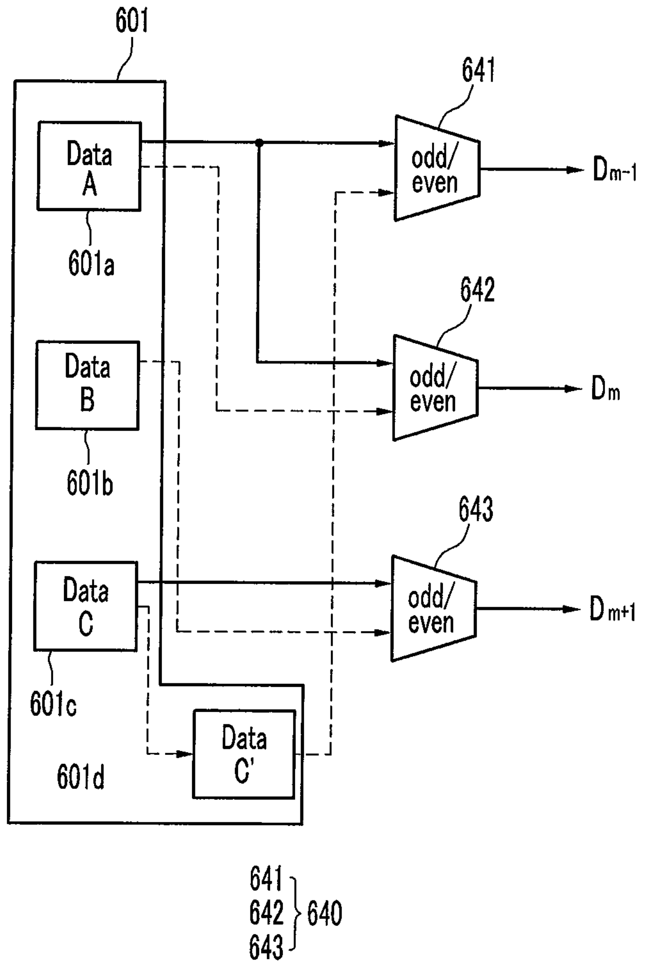
FIG. 10 is a block diagram illustrating a fourth output unit of the liquid crystal display according to the exemplary embodiment of the present invention.

FIG. 6 is a flowchart representing the output method of the image signal of the liquid crystal display according to the exemplary embodiment of the present invention, FIG. 7 is a block diagram representing the first output unit of the signal controller according to the exemplary embodiment of the present invention, FIG. 8 is a block diagram representing the second output unit of the signal controller according to the exemplary embodiment of the present invention, FIG. 9 is a block diagram representing the third output unit of the signal controller according to the exemplary embodiment of the present invention, and FIG. 10 is a block diagram representing the fourth output unit of the liquid crystal display according to the exemplary embodiment of the present invention.

Referring to FIG. 6, it is determined in step S10 whether the corresponding data line $D_1$ to $D_m$ is the first data line $D_1$. When it is determined that the corresponding data line $D_1$ to $D_m$ is the first data line $D_1$, the preliminary image signals R', G', and B' are output as the output image signal DAT through the first output unit 610.

When the corresponding data line $D_1$ to $D_m$ is not the first data line $D_1$, it is determined in step S20 whether the corresponding data line $D_1$ to $D_m$ is the last data line $D_m$. When the corresponding data line $D_1$ to $D_m$ is not the last data line $D_m$, the preliminary image signals R', G', and B' are output as the output image signal DAT through the second output unit 620.

When the corresponding data line $D_1$ to $D_m$ is the last data line $D_m$, it is determined in step S30 whether a remainder is 1 or 2 when a horizontal resolution of the liquid crystal display is divided by 3. The remainder remaining after dividing the horizontal resolution by 3 is 2 when the resolution of the liquid crystal display is 1280×800, and the remainder remaining after dividing the horizontal resolution by 3 is 1 when the resolution is 1366×768 or 1024×640. In this case, the preliminary image signals R', G', and B' are output as the output image signal DAT through the third output unit 630 when the remainder is 2, and the preliminary image signals R', G', and B' are output as the output image signal DAT through the fourth output unit 640 when the remainder is 1.

The first to fourth output units 610, 620, 630, and 640 will now be described with reference to FIG. 7 to FIG. 10. In FIG. 7 to FIG. 10, a part illustrated as a solid line is a case in which the corresponding pixel PX is in the odd row, and a part illustrated as a dotted line is a case in which the corresponding pixel PX is in the even row.

Referring to FIG. 7, the first output unit 610 according to the exemplary embodiment of the present invention includes a first multiplexer 611, a second multiplexer 612, and a third multiplexer 613.

The first multiplexer 611 is connected to the first data line $D_1$, the second multiplexer 612 is connected to the second data line $D_2$, and the third multiplexer 613 is connected to the third data line $D_3$.

The first to third multiplexers 611, 612, and 613 respectively receive the preliminary image signals R', G', and B' from the temporary storage device 601, and rearrange the data voltages according to the corresponding pixel to output the image signal.

The temporary storage device 601 includes first to third sub-storage devices 601*a*, 601*b*, and 601*c*. The sub-storage devices 601*a*, 601*b*, and 601*c* respectively read first to third data DataA, DataB, and DataC among the preliminary image signals R', G', and B' from a main-storage device (not shown). The first to third data DataA, DataB, and DataC are image signals corresponding to data voltages applied to three neighboring pixels, and the first to third data DataA, DataB, and DataC formed as one pixel unit are repeatedly applied.

The first multiplexer 611 receives the first data DataA from the first sub-storage device 601*a*, and outputs the first data DataA when the corresponding pixel PX is the odd row or the even row.

The second multiplexer 612 receives the first data DataA from the first sub-storage device 601*a*, and receives the second data DataB from the second sub-storage device 601*b*. The second multiplexer 612 outputs the second data DataB when the corresponding pixel PX is the odd row, and it outputs the first data DataA when the corresponding pixel PX is the even row.

The third multiplexer 613 receives the second data DataB from the second sub-storage device 601*b*, and receives the third data DataC from the third sub-storage device 601*c*. The third multiplexer 613 outputs the third data DataC when the corresponding pixel PX is the odd row, and it outputs the second data DataB when the corresponding pixel PX is the even row.

That is, the data voltage corresponding to the first data DataA is sequentially input twice to the first data line $D_1$. The voltages corresponding to the second data DataB and the first data DataA are sequentially input to the second data line $D_2$. Accordingly, the data voltage corresponding to the DX21 shown in FIG. 4 is the same as the voltage applied to the neighboring pixel PX21.

As shown in FIG. 8, the second output unit 620 according to the exemplary embodiment of the present invention includes a fourth multiplexer 621, a fifth multiplexer 622, and a sixth multiplexer 623.

The fourth to sixth multiplexers 621, 622, and 623 respectively receive the preliminary image signal R', G', and B' from the temporary storage device 601, and rearrange the data voltage according to the corresponding pixel to output the image signal.

The fourth to sixth multiplexers 621, 622, and 623 are connected to sequential data lines Dj, $D_{j+1}$, and $D_{j+2}$, wherein the data lines Dj, $D_{j+1}$, and $D_{j+2}$ are three data lines of the fourth data line $D_4$ to the fourth last data line $D_{m-3}$.

The temporary storage device 601 includes a fourth sub-storage device 601d in addition to the first to third sub-storage devices 601*a*, 601*b*, and 601*c*. After the first to third sub-storage devices 601*a*, 601*b*, and 601*c* read the first to third data DataA, DataB, and DataC among the preliminary image signals R', G', and B' from the main storage device, the fourth sub-storage device 601d reads the third data DataC from the third sub-storage device 601*c* to store them as fourth data DataC'.

The fourth multiplexer 621 receives the first data DataA from the first sub-storage device 601*a*, and the fourth data DataC' from the fourth sub-storage device 601*d*. The fourth multiplexer 621 outputs the first data DataA when the corresponding pixel PX is the odd row, and it outputs the fourth data DataC' when the corresponding pixel PX is the even row.

The fifth multiplexer 622 receives the first data DataA from the first sub-storage device 601*a*, and the second data DataB from the second sub-storage device 601*b*. The fifth multiplexer 622 outputs the second data DataB when the corresponding pixel PX is the odd row, and it outputs the first data DataA when the corresponding pixel PX is the even row.

The sixth multiplexer 623 receives the second data DataB from the second sub-storage device 601*b*, and receives the third data DataC from the third sub-storage device 601*c*. The sixth multiplexer 623 outputs the third data DataC when the corresponding pixel PX is the odd row, and it outputs the second data DataB when the corresponding pixel PX is the even row.

As shown in FIG. 9, the third output unit 630 according to the exemplary embodiment of the present invention includes a seventh multiplexer 631, an eighth multiplexer 632, and a ninth multiplexer 633.

The seventh to ninth multiplexers 631, 632, and 633 respectively receive the preliminary image signals R', G', and B' from the temporary storage device 601, and rearrange the data voltages according to the corresponding pixel to output the image signal.

The ninth multiplexer 633 is connected to the last data line $D_m$, and the seventh multiplexer 631 and the eighth multiplexer 632 are respectively coupled to the second last and third last data lines $D_{m-1}$ and $D_{m-2}$.

The temporary storage device 601 includes the first to fourth sub-storage devices 601*a*, 601*b*, 601*c*, and 601*d*.

The seventh multiplexer 631 receives the first data DataA from the first sub-storage device 601*a*, and the fourth data DataC' from the fourth sub-storage device 601*d*. The seventh multiplexer 631 outputs the first data DataA when the corresponding pixel PX is the odd row, and it outputs the fourth data DataC' when the corresponding pixel PX is the even row.

The eighth multiplexer 632 receives the first data DataA from the first sub-storage device 601*a*, and the second data DataB from the second sub-storage device 601*b*. The eighth multiplexer 632 outputs the second data DataB when the corresponding pixel PX is the odd row, and it outputs the first data DataA when the corresponding pixel PX is the even row.

The ninth multiplexer 633 receives the second data DataB from the second sub-storage device 601*b*. The ninth multiplexer 633 outputs the second data DataB when the corresponding pixel PX is the odd row or the even row.

That is, the data voltages corresponding to the second data DataB are sequentially input twice to the last data line $D_m$. The voltages corresponding to the second data DataB and the first data DataA are sequentially input to the third last data line $D_{m-2}$. Accordingly, in FIG. 4, the data voltage corresponding to the DX1*m* is the same as the voltage applied to the neighboring pixel PX1*m*.

As shown in FIG. 10, the fourth output unit 640 according to the exemplary embodiment of the present invention includes a tenth multiplexer 641, an eleventh multiplexer 642, and a twelfth multiplexer 643.

The tenth to twelfth multiplexers 641, 642, and 643 respectively receive the preliminary image signals R', G', and B' from the temporary storage device 601, and rearrange the data voltages according to the corresponding pixel to output the image signal.

The eleventh multiplexer 642 is connected to the last data line $D_m$, and the tenth multiplexer 641 is connected to the data line $D_{m-1}$ neighboring the last data line $D_m$. While it is illustrated that the twelfth multiplexer 643 is connected to the data line $D_{m+1}$, the data line $D_{m+1}$ may not actually be provided.

The temporary storage device 601 includes the first to fourth sub-storage devices 601*a*, 601*b*, 601*c*, and 601*d*.

The tenth multiplexer 641 receives the first data DataA from the first sub-storage device 601*a*, and the fourth data DataC' from the fourth sub-storage device 601*d*. The tenth multiplexer 641 outputs the first data DataA when the corresponding pixel PX is the odd row, and it outputs the fourth data DataC' when the corresponding pixel PX is the even row.

The eleventh multiplexer 642 receives the first data DataA from the first sub-storage device 601*a*. The eleventh multiplexer 642 outputs the first data DataA when the corresponding pixel PX is the odd row or the even row.

The twelfth multiplexer 643 receives the second data DataB from the second sub-storage device 601*b*, and the third data DataC from the third sub-storage device 601*c*. The twelfth multiplexer 643 outputs the third data DataC when the corresponding pixel PX is the odd row, and it outputs the second data DataB when the corresponding pixel PX is the even row.

That is, the data voltages corresponding to the first data DataA are sequentially input twice to the last data line $D_m$. The voltages corresponding to the first data DataA and the fourth data DataC' are sequentially input to the data line $D_{m-1}$ neighboring the last data line $D_m$. Accordingly, in FIG. 4, the data voltage corresponding to the DX1*m* is the same as the voltage applied to the pixel PX1*m*.

As described, the different output units 610, 620, 630, and 640 are selected according to cases to output the output image signals DAT rearranged according to the pixel configuration. Accordingly, when the first or last data line $D_1$ or $D_m$ is connected to no pixel in the even or odd row, the data voltage that is the same as that applied to the neighboring pixel may be input to the first or last data line $D_1$ or $D_m$.

The liquid crystal display according to the other exemplary embodiment of the present invention will now be described in further detail with reference to FIG. 4 and FIG. 11.

Figure 11:
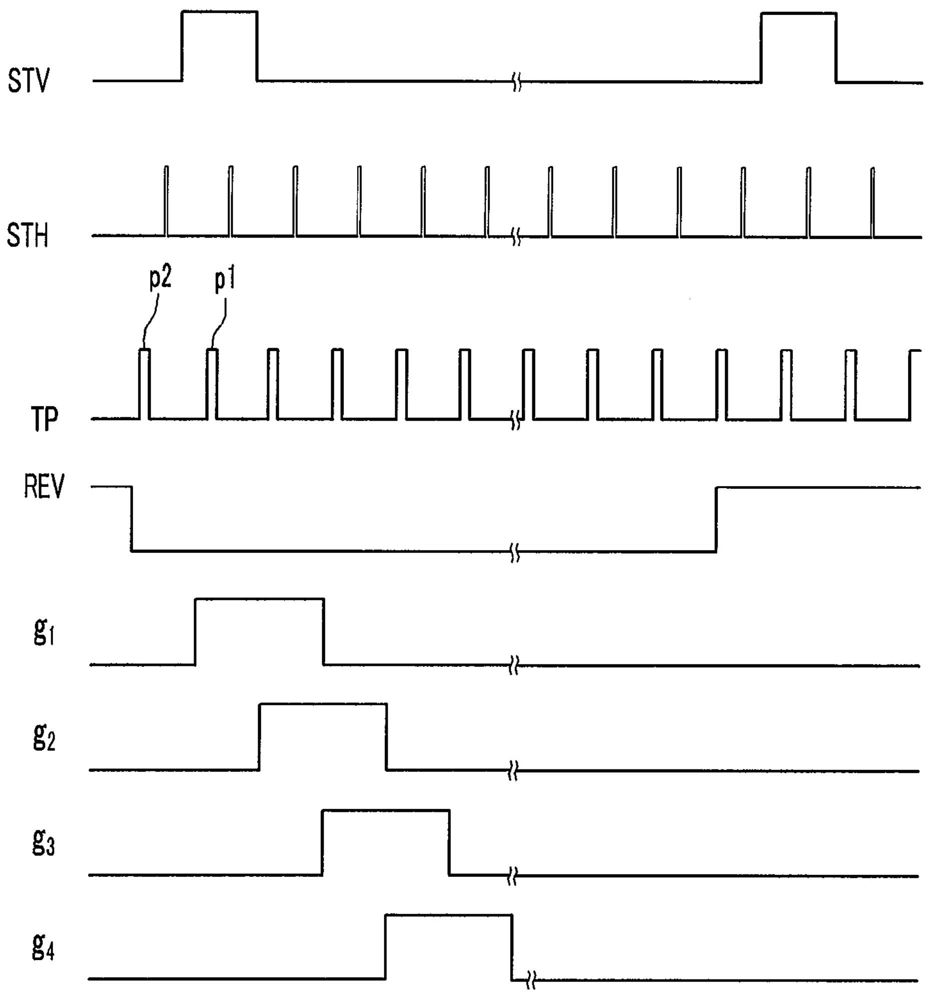
FIG. 11 is a waveform diagram showing driving signals of the liquid crystal display according to the other exemplary embodiment of the present invention.

FIG. 11 is a waveform diagram representing driving signals of the liquid crystal display according to the other exemplary embodiment of the present invention.

As shown in FIG. 11, a scanning operation is started when a pulse of the scanning start signal STV is input to the gate driver 400, and the gate signals g1, g2, g3, and g4 are overlapped to be sequentially output. One frame is between a pulse of the scanning start signal STV and a subsequent pulse.

A pulse of the horizontal synchronizing start signal STH is input to the data driver 500, and a first pulse pl of the load signal TP for applying the analog data voltage is input. A second pulse p2 output before the first pulse p1 of the load signal TP is an indication for applying the last data voltage in a previous frame. In this case, the inversion signal REV for inverting analog data voltage polarity is input to the data driver 500, and the polarity of the data voltage is inverted when a level of the inversion signal REV is changed.

According to the exemplary embodiment of the present invention, the level of the inversion signal REV is changed simultaneously or previous to the second pulse p2. That is, the level of the inversion signal REV is not changed simultaneously with the start of the corresponding frame, but the level is changed a predetermined time before the corresponding frame is started. Accordingly, the polarity of the data voltage applied to the corresponding frame is inverted, and the polarity of the data voltage finally applied to the previous frame is inverted.

Therefore, the DX11, DX12, DX13, . . . , DX1*m*−1, and DX1*m* illustrated on the pixels PX11, PX12, . . . , PX1(*m*−1), and PX1*m* of the first row in FIG. 4 have the data voltages respectively applied to the data lines $D_1$ to $D_m$ in the previous frame. The polarities of the data voltages DX11, DX12, DX13, . . . , DX1*m*−1, and DX1*m* respectively applied to the data lines $D_1$ to $D_m$ in the previous frame are the same as the polarities of the first row pixels PX11, PX12, . . . , PX1(*m*−1), and PX1*m* positioned in a diagonal direction from the data voltages DX11, DX12, DX13, . . . , DX1*m*−1, and DX1*m* respectively applied to the data lines $D_1$ to $D_m$ in the previous frame.

The first row pixels PX11, PX12, . . . , PX1(m−1), and PX1*m* are respectively pre-charged with the data voltages DX11, DX12, DX13, . . . , DX1*m*−1, and DX1*m* lastly applied to the data lines $D_1$ to $D_m$ in the previous frame. Accordingly, if the polarities thereof are opposite to each other, the first row pixels PX11, PX12, . . . , PX1(*m*−1), and PX1*m* may not be sufficiently pre-charged.

However, since the polarities of the data voltages DX11, DX12, DX13, . . . , DX1*m*−1, and DX1*m* respectively applied to the data lines $D_1$ to $D_m$ in the previous frame are the same as the polarities of the first row pixels PX11, PX12, . . . , PX1(*m*−1), and PX1*m* positioned in a diagonal direction from the data voltages DX11, DX12, DX13, . . . , DX1*m*−1, and DX1*m* respectively applied to the data lines $D_1$ to $D_m$ in the previous frame according to the exemplary embodiment of the present invention, the first row pixels PX11, PX12, . . . , PX1(m−1), and PX1*m* may be efficiently pre-charged. In this case, the data voltages DX11, DX12, DX13, . . . , DX1*m*−1, and DX1*m* respectively applied to the data lines $D_1$ to $D_m$ in the previous frame may be the data voltages corresponding to a 0 gray or an intermediate gray.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, the number of data driving chips provided to the liquid crystal display may be reduced. In addition, since all the pixels are sufficiently pre-charged, the luminance difference between neighboring pixels may be prevented, and a display quality may be increased.

What is claimed is:

1. A liquid crystal display comprising:
a plurality of pixels arranged in a matrix format;
a plurality of gate lines; and
a plurality of data lines arranged in a group, the data lines being coupled to the plurality of pixels,
wherein the group comprises a first data line disposed at a first end of the group and a last data line disposed at a second end of the group; and
a data driver coupled to the plurality of data lines, the data driver being operative to transmit data voltages to the plurality of data lines, such that a data voltage applied to a data line adjacent to the first data line is the same as a data voltage applied to the first data line at least once regardless of an image to be displayed, and the data driver being further operative to apply to a data line adjacent to the last data line the same voltage as is applied to the last data line at least once regardless of an image to be displayed.

2. The liquid crystal display of claim 1, wherein the data voltage that is the same as that of the data line adjacent the first data line is applied to every other row associated with the first data line and the voltage that is the same as that of the data line adjacent the last data line is applied to every other row associated with the last data line.

3. The liquid crystal display of claim 1, wherein the voltage that is the same as that of the data line neighboring the first data line is applied to every two other row of the first data line and the voltage that is the same as that of the data line neighboring the last data line is applied to every two other row of the last data line.

4. The liquid crystal display of claim 1, wherein each pixel comprises:
a pixel electrode having a first side that is parallel with the gate line and a second side that is shorter than the first side and is parallel with the data line; and
a thin film transistor connected to the pixel electrode, the gate line, and the data line.

5. The liquid crystal display of claim 4, wherein a ratio of a length of the first side to the length of the second side is 3:1.

6. The liquid crystal display of claim 1, wherein the polarities of the data voltages applied to one data line of the plurality of data lines are the same as each other.

7. The liquid crystal display of claim 6, wherein the polarities of the data voltages respectively applied to the neighboring data lines are opposite to each other.

8. The liquid crystal display of claim 1, wherein the first data line is connected to a thin film transistor at least every other row and the last data line is connected to the thin film transistor at least every other row.

9. The liquid crystal display of claim 1, further comprising:
a signal controller operative to process input image signals and generate preliminary image signals in response thereto, and to transmit the preliminary image signals as output image signals to the data driver,
wherein the signal controller comprises a temporary storage device that stores the preliminary image signals and a plurality of multiplexers that select preliminary image signal among the preliminary image signals stored in the temporary storage device according to a row of the pixels and output the selected preliminary image signal as the output image signal, wherein
the multiplexer comprises a first multiplexer connected to the first or last data line and a second multiplexer neighboring the first multiplexer, and further wherein
the first and second multiplexers select and output the same preliminary image signal to the pixels in the same row.

10. The liquid crystal display of claim 1, wherein the data voltage corresponding to each pixel is applied to the pixel to perform a main-charging operation after the pixel is pre-charged.

11. The liquid crystal display of claim 10, wherein a charging time of the pixel is 2/3H, and the pixel is pre-charged for a former 1/3H and the pixel is main-charged for a latter 1/3H.

12. The liquid crystal display of claim 11, wherein the charging times of the pixels neighboring in a column direction are overlapped for 1/3H.

13. The liquid crystal display of claim 10, wherein a voltage for pre-charging a first pixel row is a voltage for inverting a polarity of a voltage that is lastly applied in a previous frame.

14. The liquid crystal display of claim 13, wherein the voltage for pre-charging the first pixel row is a voltage corresponding to a 0 gray or an intermediate gray.

15. The liquid crystal display of claim 10, wherein a load signal for applying the data voltage to the pixel and an inversion signal for inverting the polarity of the data voltage for each frame are applied to the data line, the load signal comprises a first pulse and a second pulse, the first pulse pre-charges the first pixel row, the second pulse main-charges the first pixel row, and the level of the inversion signal is charged previous to the first pulse.

16. A liquid crystal display comprising:
a plurality of pixels arranged in a matrix format; and
a data line to which data voltages respectively corresponding to the plurality of pixels are to be applied,
a data driver for applying the data voltages to the data line, the data driver configured to receive a load signal to instruct application of the data voltages to the data line and an inversion signal to invert a polarity of the data voltages for each frame,
wherein the data voltage corresponding to each pixel is applied to main-charge the pixel after the pixel is pre-charged,
the load signal comprises a first pulse and a second pulse, the first pulse for applying the data voltage for pre-charging a first pixel row in a frame with a data voltage for the last pixel row in a previous frame, the second pulse for applying the data voltage for main-charging the first pixel row in the frame, and a level of the inversion signal is changed before the frame starts and before the first pulse is applied.

17. A liquid crystal display comprising:
a plurality of pixels;
a plurality of data lines connected to the pixels to transmit a data voltage to the pixels;
a data driver that applies the data voltage to the data line; and
a signal controller that processes input image signals and transmits output image signals to the data driver, wherein the signal controller comprises a temporary storage device that stores the output image signals and a plurality of multiplexers that select an output image signal among the output image signals stored in the temporary storage device according to a row of the pixels and output the selected output image signal, the multiplexer comprises a first multiplexer connected to a first or last data line in arrangement of the data lines and a second multiplexer neighboring the first multiplexer, and the first and second multiplexers select and output the same output image signal to the pixels in the same row regardless of an image to be displayed.

18. The liquid crystal display of claim 17, wherein the signal controller comprises a first output unit and a second output unit, the output image signal applied to the first data line is output through the first output unit, and the output image signal applied to the last data line is output through the second output unit.

19. The liquid crystal display of claim 18, wherein the first output unit comprises a first multiplexer connected to the first data line and a second multiplexer connected to the second data line, and the first and second multiplexers select the preliminary image signal in an odd row or an even row and output the selected preliminary image signal as the output image signal.

20. The liquid crystal display of claim 18, wherein the second output unit comprises a first multiplexer connected to the last data line and a second multiplexer connected to the data line neighboring the last data line, and the first and second multiplexers select and output the same output image signal in an odd row or an even row.

21. The liquid crystal display of claim 17, wherein the pixel comprises:

a pixel electrode having a first side that is parallel to the data line and a second side that is longer than the first side and neighbors the first side; and a thin film transistor connected to the pixel electrode.

22. The liquid crystal display of claim 21, wherein a ratio of a length of the first side to the length of the second side is 1:3.

23. The liquid crystal display of claim 17, wherein polarities of the data voltages applied to one data line among the data lines are the same as each other.

24. The liquid crystal display of claim 17, wherein polarities of the data voltages respectively applied to the neighboring data lines are opposite to each other.

25. The liquid crystal display of claim 17, wherein the first data line is connected to a thin film transistor at least every other row and the last data line is connected to the thin film transistor at least every other row.

* * * * *